(12) United States Patent
Pal et al.

(10) Patent No.: US 9,903,666 B2
(45) Date of Patent: Feb. 27, 2018

(54) MOTOR STATOR COOLING WITH DUAL COOLANT TWO-PHASE HEAT EXCHANGER

(71) Applicant: Hamilton Sundstrand Corporation, Charlotte, NC (US)

(72) Inventors: Debabrata Pal, Hoffman Estates, IL (US); Craig R. Legros, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 471 days.

(21) Appl. No.: 14/573,785

(22) Filed: Dec. 17, 2014

(65) Prior Publication Data
US 2016/0178285 A1    Jun. 23, 2016

(51) Int. Cl.
| | |
|---|---|
| *F28D 5/00* | (2006.01) |
| *F28F 1/10* | (2006.01) |
| *B64D 13/06* | (2006.01) |
| *H02K 9/06* | (2006.01) |
| *H02K 9/14* | (2006.01) |

(52) U.S. Cl.
CPC ............. *F28F 1/10* (2013.01); *B64D 13/06* (2013.01); *H02K 9/06* (2013.01); *H02K 9/14* (2013.01); *B64D 2013/0618* (2013.01); *B64D 2013/0644* (2013.01); *Y02T 50/56* (2013.01)

(58) Field of Classification Search
CPC .... H02K 9/14; H02K 9/06; F28F 1/10; B64D 13/06

USPC .................................................... 62/314, 304
See application file for complete search history.

(56) References Cited

U.S. PATENT DOCUMENTS

| | | | | |
|---|---|---|---|---|
| 5,323,624 | A * | 6/1994 | Schwalm | B64D 13/06 62/401 |
| 8,893,519 | B2 * | 11/2014 | Gao | B23Q 11/10 451/449 |
| 2002/0088243 | A1 * | 7/2002 | Holtzapple | B01D 53/265 62/268 |
| 2007/0221165 | A1 | 9/2007 | Yamaguchi | |
| 2009/0249808 | A1 | 10/2009 | Ullman | |

FOREIGN PATENT DOCUMENTS

| | | | |
|---|---|---|---|
| CN | 203761201 U | * | 8/2014 |
| JP | 2004180479 A | * | 6/2004 |
| JP | 2008306861 | | 12/2008 |

OTHER PUBLICATIONS

European Search Report and issued EP 15200426.3; dated Apr. 25, 2016; 28 pages.

* cited by examiner

*Primary Examiner* — Ljiljana Ciric
(74) *Attorney, Agent, or Firm* — Cantor Colburn LLP

(57) ABSTRACT

A mist cooling system that includes a casing and a liquid inlet. The casing is configured to receive a liquid flow from a source through the liquid inlet and then provide the liquid flow as a mist to a housing of a motor so as to increase a cooling of the motor and prevent any failure of the motor due to overheating.

6 Claims, 2 Drawing Sheets

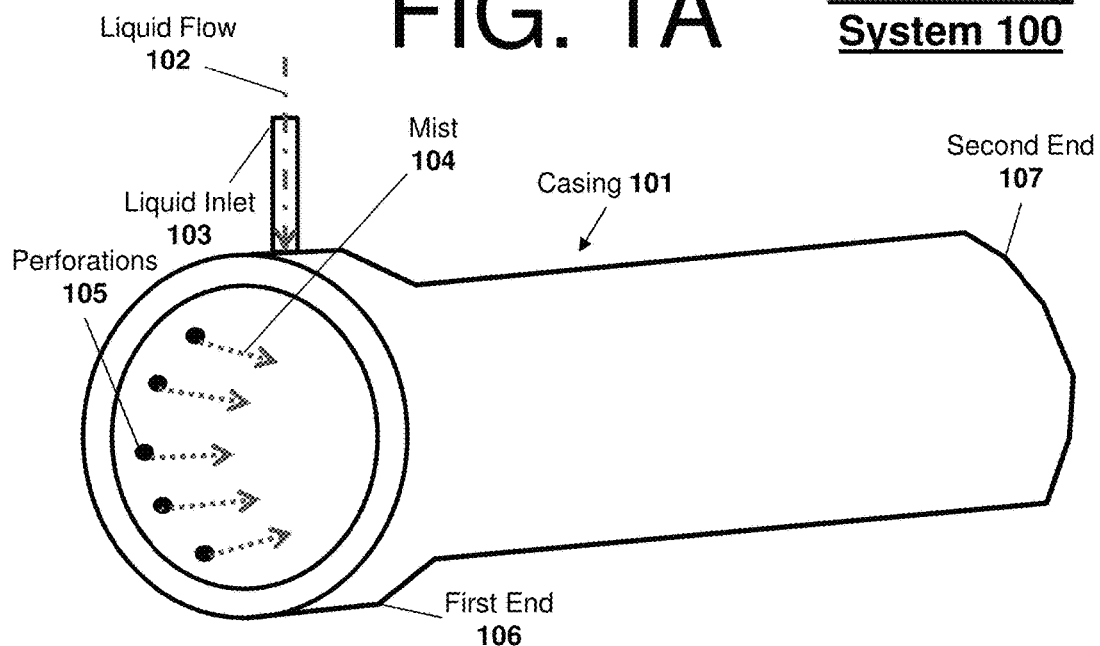
FIG. 1A  Mist Cooling System 100
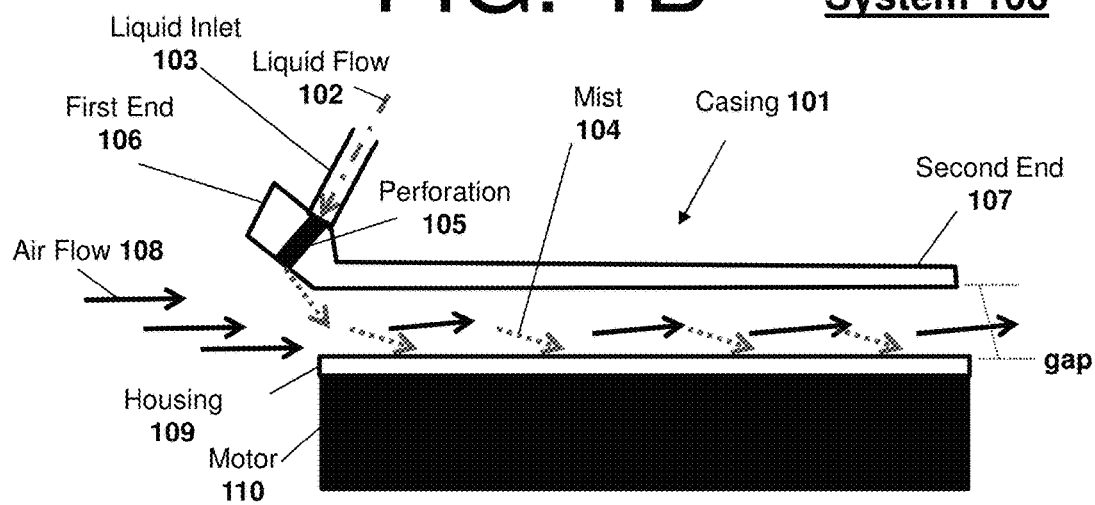
FIG. 1B  Mist Cooling System 100

MOTOR STATOR COOLING WITH DUAL COOLANT TWO-PHASE HEAT EXCHANGER

BACKGROUND OF THE INVENTION

Motor cooling is generally performed by air cooling systems. Yet, air cooling risks foreign object debris entering and blocking cooling channels of the air cooling systems. Further, foreign object debris results in a reduction of motor cooling and subsequent overheating and failure of the motor itself. Air cooling systems do not provide for foreign object debris removal until a mechanic is physically present to service the motor and the air cooling system. Thus, systems that provide alternate cooling services for the motor that provide cooling despite foreign object debris would be well-received in the art.

BRIEF DESCRIPTION OF THE INVENTION

According to one embodiment, a mist cooling system that comprises a casing comprising a first end, a second end, and at least one perforation at the first end; and a liquid inlet coupled to the casing and configured to receive a liquid flow from a source and to provide the liquid flow to the casing, wherein the at least perforation is configured to output a mist from the liquid flow.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1A and FIG. 1B are an example of a schematic of a mist cooling system according to one embodiment.

DETAILED DESCRIPTION OF THE INVENTION

Figure 2:
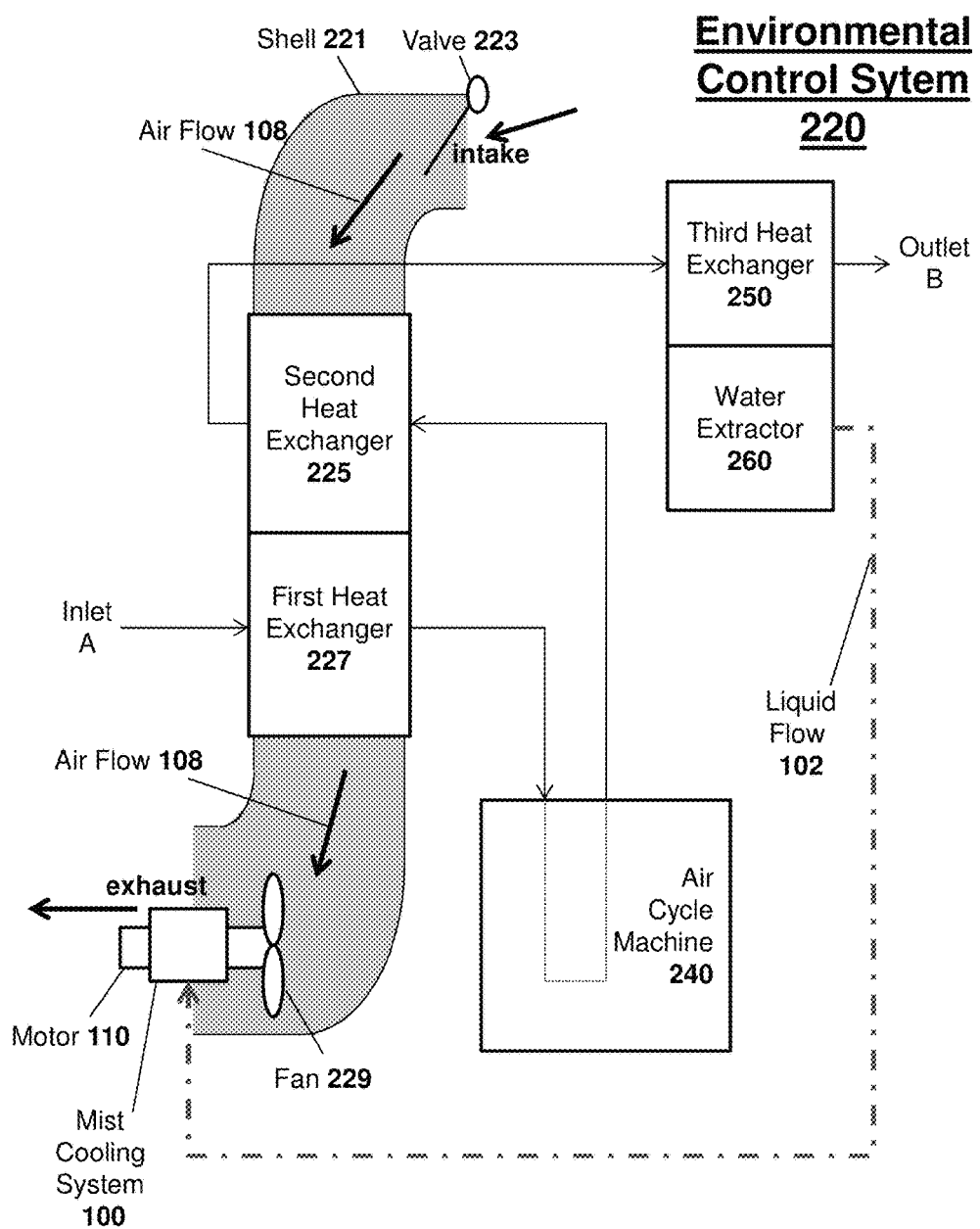
FIG. 2 is a diagram of a schematic of an environmental control system according to an embodiment.

A detailed description of one or more embodiments of the disclosed system, apparatus, and method are presented herein by way of exemplification and not limitation with reference to the Figures. In general, embodiments herein relate to a mist cooling system that can act as redundant cooling system to an air cooling system, so that heat transfer on a motor housing is enhanced by an air/water mist cooling.

FIG. 1A and FIG. 1B are an example of a schematic of a mist cooling system 100 according to one embodiment, where FIG. 1A is an isometric view of the mist cooling system 100 and FIG. 1B is a profile view. The mist cooling system 100 includes a casing 101 configured to receive a liquid flow 102 from a liquid inlet 103 so as to provide a mist 104 through perforations 105. The mist 104 is driven from a first end 106 of the casing 101 to a second end 107 of the casing 101 by an air flow 108 through a gap between the casing 101 and a housing 109 of a motor 110. As illustrated, the mist cooling system is a two-phase spray and water-air mist generator ring that envelops or is fitted on the housing 109.

The casing 101 at the first end 106 includes internal channels that connect the liquid inlet 103 and the perforations 105, such that the liquid flow 102 can be provided to the interior of the casing 101 (e.g., provided into the gap). In turn, the liquid flow 102 is entrained in the air flow 108 to provide a liquid air stream (e.g., the mist 104). The mist 104 provides enhanced cooling at a very high heat transfer as the mist 104 contacts the housing 109. That is, mist with water impingement on housing 109 causes phase change from water to vapor. Further, latent heat of evaporation results in additional heat transfer from the heated housing 109 there by resulting in improved cooling. A temperature of the liquid flow 102, a flow rate of the mist 104 due to a size of the perforations 105, a surface area of the housing 109, a temperature of the housing due to the operations of the motor, etc. all contribute to the this cooling enhancement, which can result in a percentage reduction of heat (e.g., a motor temperature was reduced by 8% or 13 degrees from 155 Celsius to 142 Celsius). The liquid flow 102 can be provided from any liquid source, such as water from a water extractor, when the motor 110 is operating. Further, the liquid flow rate for cooling can be 1-2 pounds/minute and entrained air flow rate can be 8-16 pounds/minutes.

With respect to the air flow 108, the first end 106 is configured at an angle to provide a low pressure zone that draws the liquid flow 102 from the perforations 105. The angle itself relates to an amount of the air flow 108 that is forced into the gap and a flow rate or velocity of the air flow 108 (e.g., hundreds of feet per second). For instance, the air flow 108 arrives at and is received by the first end 106 at a first velocity, which enables the entrained liquid flow 102 to be entrained in the air flow 108 to create the mist 104 and drives the mist 104 from the first end 106 to the second end 107.

With respect to the perforations 105, the first end 106 may include one or more perforations 105, each of which can be sized and/or oriented to provide a particular flow rate for the liquid flow 102 to the interior of the casing 101. That is, if the perforations 105 are too large, then the mist 104 will have too much liquid flow 102 to correctly cool the housing 109 (e.g., water will be dumped directly on the housing 109). Similarly, if the perforations 105 are too small, then the mist 104 will have too little liquid flow 102 to correctly cool the housing 109 (e.g., only air will flow through the gap). The perforations 105 may be uniform in size, and/or equally separated and circumferentially aligned along an interior of the casing as shown in FIG. 1B. The perforations 105 may also be geometric shaped, variously sized, and/or randomly placed along an interior of the casing, such that an individual surface area or a combined surface area generates a desired flow rate of the mist 104. Examples of geometric shapes for the perforations 105 include a rectangular slit, an ellipse, a circle, a triangle, etc.

The mist cooling system 100 of FIGS. 1A and 1B will now be described with reference to FIG. 2. FIG. 2 illustrates an environmental control system 220 of a vehicle (e.g., an aircraft) that, in addition to the mist cooling system 100, the liquid flow 102, the air flow 108, and the motor 111, includes a shell 221, a valve 223, a first heat exchanger 225, a secondary heat exchanger 227, a fan 229, an air cycle machine 240, a third heat exchanger 250, and a water extractor 260, each of which are connected via tubes, pipes, ducts and the like, such that a medium is accepted at Inlet A from an engine at an initial flow rate, pressure, and temperature and provided to an Outlet B at a final flow rate, pressure, and temperature.

The environmental control system 220 is an example of any environmental control system employed on a vehicle. For ease of explanation, the environmental control system 220 will be described with reference to an aircraft to provide air supply, thermal control, and cabin pressurization for the crew and passengers of the aircraft. The environmental control system 220 is only one example of an environmental control system and is not intended to suggest any limitation as to the scope of use or operability of embodiments of the invention described herein (indeed additional or alternative components and/or implementations may be used).

The shell 221 is an example of a ram chamber of a ram system which uses dynamic air pressure created by the motion of the aircraft to increase a static air pressure inside of the shell 221. Valves, such as valve 223, are devices that regulate, direct, and/or control a flow of the medium (e.g., gases, liquids, fluidized solids, or slurries, such as bleed-air) by opening, closing, or partially obstructing various passageways within the tubes, pipes, etc. of the environmental control system 220. Valves may be operated by actuators such that the flow rates of any medium in any portion of the environmental control system 220 may be regulated to a desired value. For example, the valve 223 enables the intake of ambient air external to the aircraft into the shell 221, such that the ambient air may pass through the first and second heat exchangers 225, 227 and cool the bleed-air before exiting as an exhaust.

Heat exchangers (e.g., a first heat exchanger 225 and a secondary heat exchanger 227) are equipment built for efficient heat transfer from one medium to another. Examples of heat exchangers include double pipe, shell and tube, plate, plate and shell, adiabatic wheel, plate fin, pillow plate, and fluid heat exchangers.

The fan 229 is a mechanical device that forces via intake methods the ambient air through the shell 221 across the heat exchangers 225, 227 at a variable cooling flow. The intake methods may also include push or pull methods driven by the fan 229 and/or a ram method based on the motion of the vehicle. The fan 229 may be coupled to the air cycle machine 240.

The air cycle machine 240 can regulate a pressure of the medium (e.g., increasing the pressure of the bleed-air) and includes at least one turbine and at least one compressor to provide power and compression to the environmental control system 220. Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

The heat exchanger 250 is an example of a heat exchanger as described above. The water extractor 260 is a mechanical device that performs a process of taking water from any source, such as bleed-air, either temporarily or permanently.

In operation, the air flow 108 is generated from a pull method by the fan 229, such that ambient air external to the aircraft is pulled into (e.g., intake) the shell 221 past the valve 223. The ambient air is now ram air that flows through the shell 221, passes through the first and second heat exchangers 225, 227 to cool the bleed-air, and exits as exhaust. A portion of the ram air is drawn between the mist cooling system 100 and the motor 110 and combined with the liquid flow 102 to create the mist 104 that is utilized to cool the motor 110. In turn, the motor 110 will be more efficiently cooled, resulting in a lower motor 110 temperature, which will increase the motor's 110 life and reliability. In addition, the mist cooling system 100 will allow better cooling during a blocked back iron cooling due a disrupted air flow 108 due to foreign object debris.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A mist cooling system, comprising:
   a casing comprising a first end, a second end, at least one perforation at the first end, and at least one internal channel corresponding to the at least one perforation; and
   a liquid inlet coupled to the casing and configured to receive a liquid flow from a source and to provide the liquid flow to the casing,
   wherein the at least one perforation is configured to output a mist from the liquid flow,
   wherein the casing envelops a portion of a motor housing,
   wherein an air flow is provided within a gap between the motor housing and the casing, and
   wherein the at least one internal channel provides the liquid flow from the liquid inlet to the at least one perforation and interior of the casing.

2. The mist cooling system of claim 1, wherein the first end comprises an angled configuration to provide a low pressure zone at the first end, and wherein the low pressure zone draws the liquid flow from the at least one perforation as the mist.

3. The mist cooling system of claim 1, wherein the first end comprises an angled configuration to receive an air flow at a first velocity, and wherein the air flow drives the mist from the first end to the second end.

4. The system of claim 1, wherein the at least one perforation is a plurality of perforations equally and circumferentially separated along an interior of the casing.

5. The system of claim 1, wherein the at least one perforation comprises a geometric shape selected from a rectangular slit, an ellipse, a circle, and a triangle.

6. The system of claim 1, wherein the mist cooling system is incorporated into an environmental control system.

* * * * *